United States Patent
Song et al.

(10) Patent No.: US 11,941,813 B2
(45) Date of Patent: Mar. 26, 2024

(54) SYSTEMS AND METHODS FOR PERFORMING SEGMENTATION BASED ON TENSOR INPUTS

(71) Applicant: NantCell, Inc., Culver City, CA (US)

(72) Inventors: Bing Song, La Canada, CA (US); Nicholas James Witchey, Laguna Hills, CA (US); Albert Wu, Calabasas, CA (US); Krsto Sbutega, Redondo Beach, CA (US); Patrick Soon-Shiong, Los Angeles, CA (US)

(73) Assignee: NantCell, Inc., Culver City, CA (US)

( * ) Notice: Subject to any disclaimer, the term of this patent is extended or adjusted under 35 U.S.C. 154(b) by 313 days.

(21) Appl. No.: 16/996,068

(22) Filed: Aug. 18, 2020

(65) Prior Publication Data

US 2021/0056363 A1 Feb. 25, 2021

Related U.S. Application Data

(60) Provisional application No. 62/890,767, filed on Aug. 23, 2019.

(51) Int. Cl.
 *G06N 3/0455* (2023.01)
 *G06F 18/21* (2023.01)
 (Continued)

(52) U.S. Cl.
 CPC ............. *G06T 7/11* (2017.01); *G06F 18/211* (2023.01); *G06F 18/2163* (2023.01);
 (Continued)

(58) Field of Classification Search
 CPC ........ G06N 3/0454; G06N 3/08; G06N 3/084; G06N 3/0445; G06N 3/0481; G06N 3/04;
 (Continued)

(56) References Cited

U.S. PATENT DOCUMENTS

| 10,664,953 B1 * | 5/2020 | Lanman | G06T 5/002 |
| 2017/0249548 A1 * | 8/2017 | Nelson | G06V 20/69 |

(Continued)

FOREIGN PATENT DOCUMENTS

| CA | 3041103 A1 * | 4/2018 | G01N 15/0625 |
| CN | 106372577 A * | 2/2017 | G06K 9/00818 |

(Continued)

OTHER PUBLICATIONS

Annotated Search Machine translation of CN-106372577-A to Yu et al., retrieved Sep. 16, 2022, 12 pages. (Year: 2022).*

(Continued)

*Primary Examiner* — Matthew C Bella
*Assistant Examiner* — Dennis Rosario
(74) *Attorney, Agent, or Firm* — Harness Dickey & Pierce P.L.C.

(57) ABSTRACT

An example system for performing segmentation of data based on tensor inputs includes memory storing computer-executable instructions defining a learning network, where the learning network includes a plurality of sequential encoder down-sampling blocks. A processor is configured to execute the computer-executable instructions to receive a multi-dimensional input tensor including at least a first dimension, a second dimension and a plurality of channels. The processor is also configured to process the received multi-dimensional input tensor by passing the received multi-dimensional input tensor through the plurality of sequential encoder down-sampling blocks of the learning network, and to generate an output tensor in response to processing the received multi-dimensional input tensor. The output tensor includes at least one segmentation classification.

19 Claims, 8 Drawing Sheets

(51) Int. Cl.

| | | |
|---|---|---|
| *G06F 18/211* | (2023.01) | |
| *G06F 18/241* | (2023.01) | |
| *G06N 3/084* | (2023.01) | |
| *G06N 5/046* | (2023.01) | |
| *G06T 7/10* | (2017.01) | |
| *G06T 7/11* | (2017.01) | |
| *G06T 7/73* | (2017.01) | |
| *G06V 20/69* | (2022.01) | |

(52) U.S. Cl.
CPC ......... *G06F 18/241* (2023.01); *G06N 3/0455* (2023.01); *G06N 3/084* (2013.01); *G06N 5/046* (2013.01); *G06T 7/10* (2017.01); *G06T 7/74* (2017.01); *G06V 20/695* (2022.01); *G06V 20/698* (2022.01); *G06T 2207/20081* (2013.01); *G06T 2210/22* (2013.01)

(58) Field of Classification Search
CPC ........ G06N 3/082; G06N 20/00; G06N 3/088; G06N 3/0895; G06N 3/09; G06N 3/091; G06N 3/092; G06N 3/094; G06N 3/096; G06N 3/098; G06N 3/0985; G06N 3/086; G06N 20/10; G06N 20/20; G06N 3/0455; G06N 7/023; G06T 2207/20084; G06T 2207/20081; G06T 3/4046; G06T 9/002; G06T 7/0012; G06T 2207/30024; G06T 2207/10056; G06T 2207/10024; G06T 7/74; G06T 7/194; G06T 7/10; G06T 3/4023; G06T 7/215; G06T 7/248; G06T 9/00; G06T 2207/10036; G06T 2210/22; G06V 10/82; G06V 10/26; G06V 10/764; G06V 20/695; G06V 20/49; G06V 30/19173; G06V 20/698; G06V 20/41; G06V 10/809; G06V 30/2528; G06V 40/172; G06V 30/413; G06V 10/70; G06V 20/69; G06V 10/462; G06V 10/46; G06V 40/1365; G06V 10/467; G06V 10/56; G06V 40/197; G06V 20/35; G06K 9/6267; G06K 9/6268; G06K 9/627; G06K 9/6256; G06K 9/628; G06K 9/6292; A61B 5/7267; G06F 18/24; G06F 16/285; G06F 18/24155; G06F 18/24317; G06F 2218/12; G06F 16/35; G06F 16/75; G06F 16/55; G06F 16/906; G06F 30/27
See application file for complete search history.

(56) References Cited

U.S. PATENT DOCUMENTS

| 2019/0035113 A1* | 1/2019 | Salvi | G06T 9/002 |
|---|---|---|---|
| 2019/0266418 A1* | 8/2019 | Xu | G06V 10/764 |
| 2020/0302224 A1* | 9/2020 | Jaganathan | G06N 3/045 |
| 2022/0084660 A1* | 3/2022 | Georgescu | G16H 30/40 |
| 2022/0262002 A1* | 8/2022 | Wang | G06V 10/454 |

FOREIGN PATENT DOCUMENTS

| WO | WO-2019110583 A1 * | 6/2019 | G06K 9/00147 |
|---|---|---|---|
| WO | WO-2020253947 A1 * | 12/2020 | G06N 3/0445 |

OTHER PUBLICATIONS

Provisional application data of U.S. Appl. No. 62/869,253: specification of US-2022/0262002-A1 to Wang, Jul. 1, 2019 [retrieved Sep. 16, 2022] 13 pages. (Year: 2019).*

Provisional application data of U.S. Appl. No. 62/869,253: drawings of US-2022/0262002-A1 to Wang, Jul. 1, 2019 [retrieved Sep. 16, 2022], 4 pages. (Year: 2019).*

Yu et al., Fruit detection for strawberry harvesting robot in nonstructural environment based on Mask-RCNN, Available online: Jun. 14, 2019 [retrieved Feb. 3, 2023], Computers and Electronics in Agriculture, vol. 163, pp. 1-9. (Year: 2019).*

Item U continued] Retrieved: https://www.sciencedirect.com/science/article/pii/S0168169919301103 (Year: 2019).*

U.S. Appl. No. 62/854,030 of US 2022/0084660 A1 to Georgescu, filed May 29, 2019 [retrieved Apr. 1, 2023], pp. (Year: 2019).*

Noh et al., Learning Deconvolution Network for Semantic Segmentation, Dec. 7-13, 2015 [retrieved May 12, 2023], 2015 IEEE International Conference on Computer Vision, pp. 1520-1528. Retrieved: https://ieeexplore.ieee.org/abstract/document/7410535 (Year: 2015).*

Ioffe, Sergey and Szegedy, Christian, "Batch Normalization: Accelerating Deep Network Training by Reducing Internal Covariate Shift," Mar. 2, 2015, p. 1-11.

Ronneberger, O., et al., "U-Net: Convolutional Networks for Biomedical Image Segmentation," BIOSS Centre for Biological Signaling Studies, University of Freiburg, Germany, (2015), p. 1-8.

International Search Report from corresponding PCT Application No. PCT/US2020/046748 dated Oct. 29, 2020.

Written Opinion from corresponding PCT Application No. PCT/US2020/046748 dated Oct. 29, 2020.

Patravali, J., et al., "2D-3D Fully Convolutional Neural Networks for Cardiac MR Segmentation," Cornell University Library, (2017).

Rezaei, M., et al., "voxel-GAN: Adversarial Framework for Learning Imbalanced Brain Tumor Segmentation," Advances in Databases and Information Systems, p. 321-333 (2019).

Iglovikov, V., et al., "Satellite Imagery Feature Detection using Deep Convolutional Neural Network: A Kaggle Competition," Cornell University Library, (2017).

Kao, P.Y., et al., "Improving 3D U-Net for Brain Tumor Segmentation by Utilizing Lesion Prior," Cornell University Library, (2019).

* cited by examiner

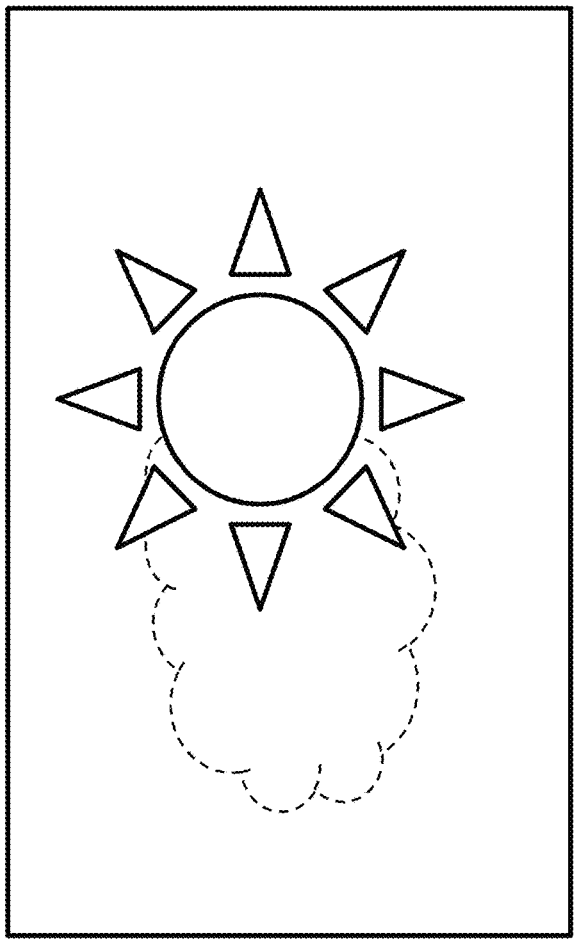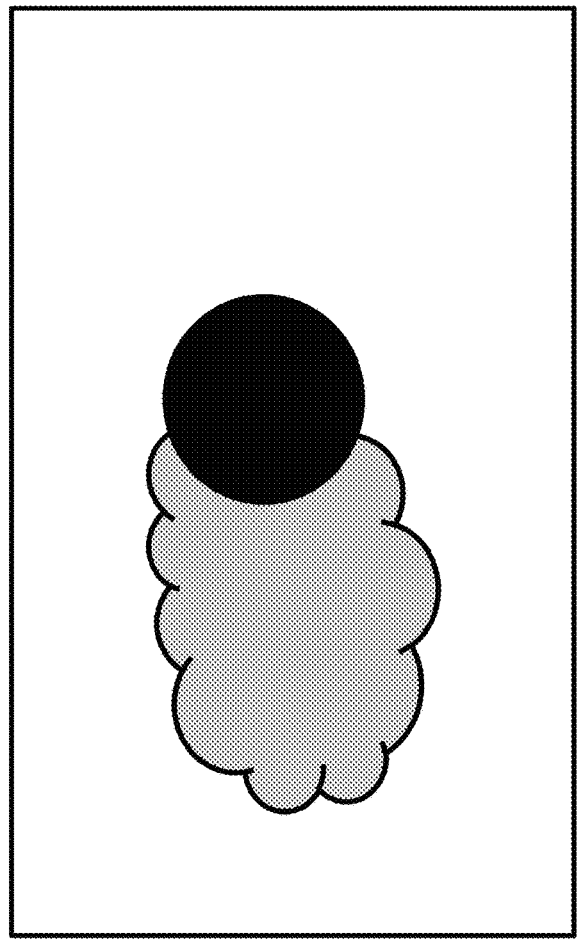
FIG. 3A
FIG. 3B

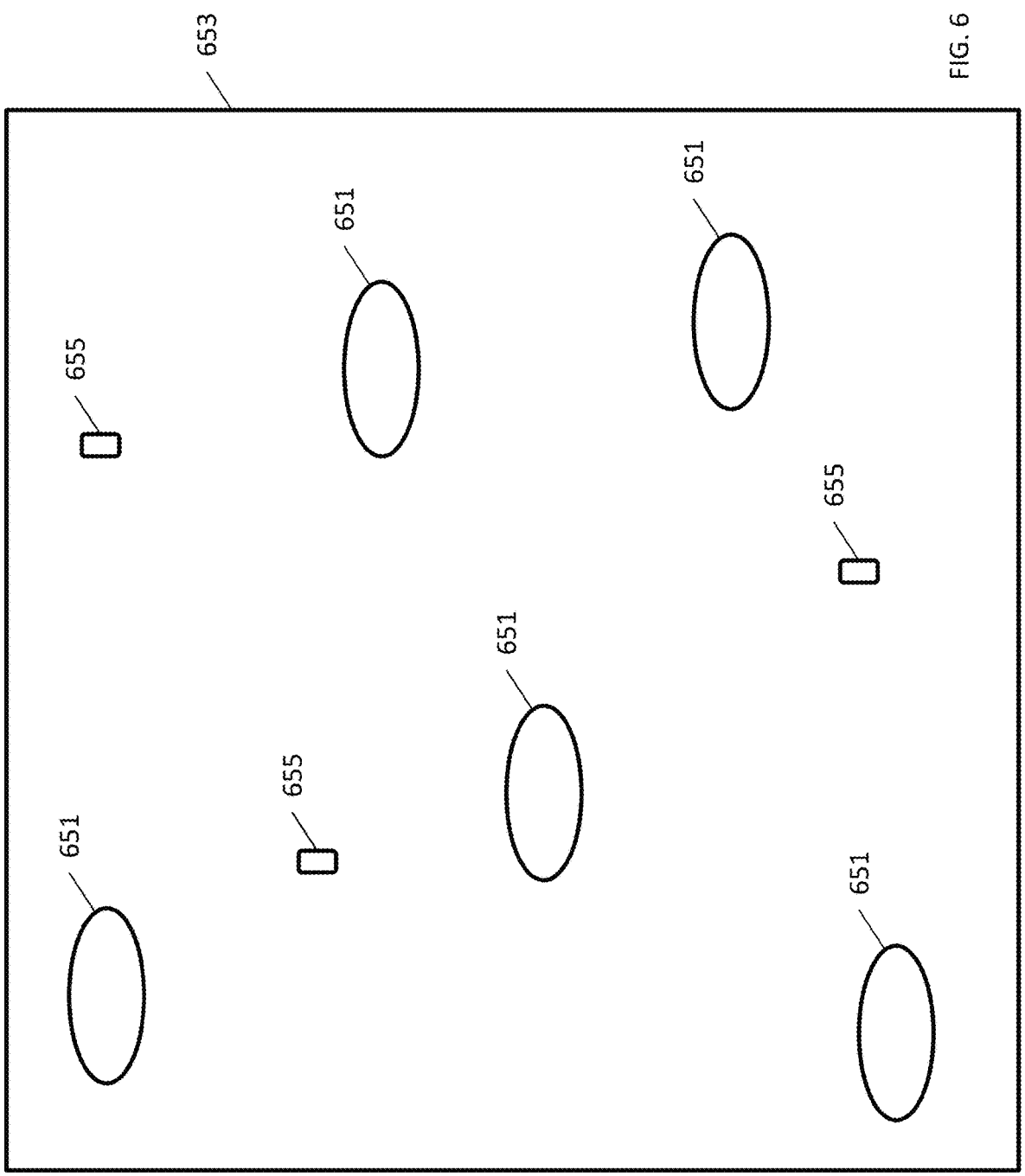

SYSTEMS AND METHODS FOR PERFORMING SEGMENTATION BASED ON TENSOR INPUTS

CROSS-REFERENCE TO RELATED APPLICATION

This application claims the benefit of, and priority to, U.S. Provisional Application Ser. No. 62/890,767 filed Aug. 23, 2019. The entire disclosure of the above application is incorporated herein by reference.

FIELD

The present disclosure generally relates to systems and methods for performing segmentation based on tensor inputs.

BACKGROUND

This section provides background information related to the present disclosure which is not necessarily prior art.

The UNet convolutional neural network was developed for biomedical image segmentation. The UNet convolutional neural network receives either a gray or color image as an input, and outputs an image including a segmentation mask (e.g., for edge detection, object classification, etc.).

SUMMARY

According to one example embodiment of the present disclosure, an example system for performing segmentation of data based on tensor inputs includes memory storing computer-executable instructions defining a learning network, where the learning network includes a plurality of sequential encoder down-sampling blocks and a plurality of sequential decoder up-sampling blocks. A processor is configured to execute the computer-executable instructions to receive a multi-dimensional input tensor including at least a first dimension, a second dimension and a plurality of channels. The processor is also configured to process the received multi-dimensional input tensor by passing the received multi-dimensional input tensor through the plurality of sequential encoder down-sampling blocks and the plurality of sequential decoder up-sampling blocks of the learning network, and to generate an output tensor in response to processing the received multi-dimensional input tensor using the plurality of sequential encoder down-sampling blocks and the plurality of sequential decoder up-sampling blocks of the learning network. The output tensor includes at least one segmentation classification.

According to another example embodiment of the present disclosure, a computer-implemented method of training an image segmentation model includes receiving a training image for the image segmentation model, where the received training image has a training image size, and selecting a patch size, where the selected patch size is smaller than the training image size. The method also includes selecting two random integers, cropping a training patch from the training image, the training patch having an origin according to the selected two random integers, and training the image segmentation model using the cropped training patch to adjust connections within the image segmentation model. The method further includes repeating the selection of random integers, cropping of a training patch, and training of the image segmentation model to train the model with a plurality of randomly selected cropped training patches, where each randomly selected cropped training patch is cropped from the training image using an origin based on different random integers.

According to yet another example embodiment of the present disclosure, a non-transitory computer readable medium includes computer-executable instructions that define a learning network, where the learning network includes multiple encoder down-sampling blocks and multiple decoder up-sampling blocks. The computer-executable instructions are executable by the processor to train the learning network using randomly selected patches from multiple training images, where each randomly selected patch is smaller than its corresponding training image, and each randomly selected patch is used to adjust connections within the multiple encoder down-sampling blocks and multiple decoder up-sampling blocks during training of the learning network. The computer-executable instructions are further executable by the processor to supply a multi-dimensional input tensor to the trained learning network by passing the multi-dimensional input tensor through the trained multiple encoder down-sampling blocks and the trained multiple decoder up-sampling blocks to generate an output tensor including at least two segmentation classifications.

DRAWINGS

The drawings described herein are for illustrative purposes only of selected embodiments and not all possible implementations, and are not intended to limit the scope of the present disclosure.

FIGS. 3A and 3B are example representative normal and optical density space images, respectively, of clouds located near the sun.

FIG. 6 is a block diagram of use of a model for detecting WiFi signal strength in a shopping area, according to another example embodiment of the present disclosure.

Corresponding reference numerals indicate corresponding (but not necessarily identical) parts throughout the several views of the drawings.

DETAILED DESCRIPTION

Example embodiments will now be described more fully with reference to the accompanying drawings.

The UNet convolutional neural network was developed for biomedical image segmentation. The UNet convolutional neural network receives either a gray or color images as inputs, and outputs an image including a segmentation mask (e.g., for edge detection, object classification, etc.). An example UNet convolutional neural network is described in *U-Net: Convolutional Networks for Biomedical Image Seg-*

*mentation*, published May 18, 2015 by Olaf Ronneberger, Philipp Fischer, and Thomas Brox, Computer Science Department and BIOSS Centre for Biological Signaling Studies, University of Freiburg, Germany. The entire disclosure of the above reference is incorporated herein by reference.

However, in many real world applications it is desirable to process and classify an input that includes multiple images (e.g., a three-dimensional input, multiple layers of a three-dimensional input, images in a video sequence, a sequence of photos or images, etc.). Disclosed herein are example embodiments of convolutional neural networks (e.g., learning networks) that generalize the input as a three-dimensional (3D) tensor. For example, when the input includes multiple images, the multiple images may be stacked into a 3D tensor and supplied to the learning network for segmentation classification (e.g., image segmentation, etc.).

Existing models such as the UNet convolutional neural network require building a model for each image, and then assembling the final results of each image at the end of the UNet convolutional neural network pipeline. In contrast, example learning networks described herein may use generalized 3D tensor inputs to increase the functionality of the learning network to process multiple images in the same learning network via the 3D tensor input, which may significantly increase the accuracy of the learning network because deep learning parameters are adjusted, in some cases simultaneously.

Figure 1:
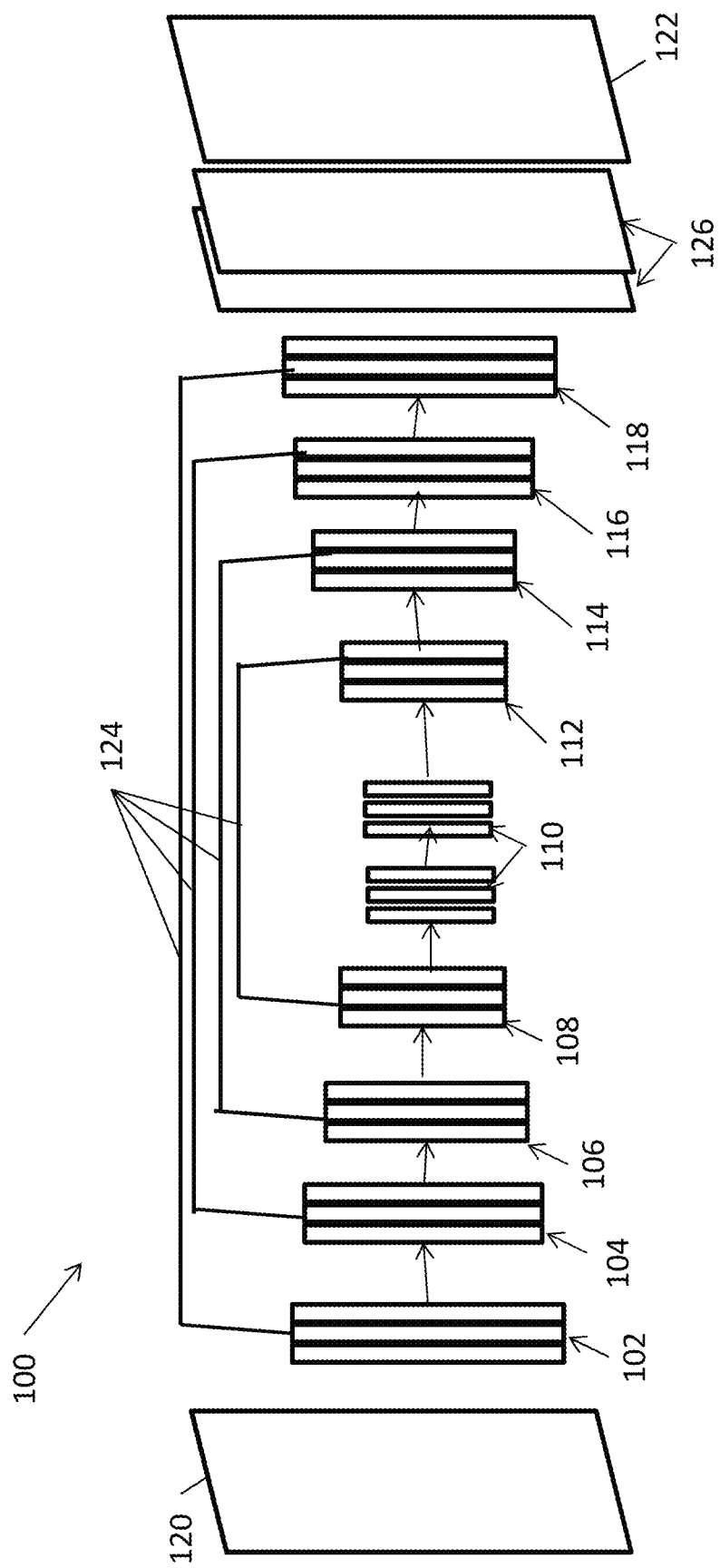
FIG. 1 is a block diagram of a learning network including multiple encoder and decoder blocks, according to one example embodiment of the present disclosure.

According to one example embodiment of the present disclosure, a system for performing segmentation of data based on tensor inputs includes a memory storing computer-executable instructions defining a learning network 100, as illustrated in FIG. 1. As shown in FIG. 1, the learning network includes multiple encoder down-sampling blocks 102, 104, 106 and 108, and multiple decoder up-sampling blocks 112, 114, 116 and 118.

The encoder down-sampling blocks 102, 104, 106 and 108 are connected sequentially, with the encoder block 102 arranged to receive a multi-dimensional input tensor 120, process the received multi-dimensional input tensor 120 (as explained further below), and supply a processed tensor to encoder block 104. The encoder block 104 is arranged to receive the tensor processed by encoder block 102, further process the received tensor, and supply the further processed tensor to encoder block 106. This is further repeated with encoder blocks 106 and 108. Optional center block(s) 110 may be positioned between the last encoder block 108 and the first decoder block 112.

The decoder up-sampling blocks 112, 114, 116 and 118 are also connected sequentially, with the decoder block 112 arranged to receive a processed tensor from the optional center block(s) 110 or the last encoder block 108, process the received tensor (as explained further below), and supply a processed tensor to decoder block 114. The decoder block 114 is arranged to receive the tensor processed by decoder block 112, further process the received tensor, and supply the further processed tensor to decoder block 116. This is further repeated with decoder blocks 116 and 118.

The system also includes a processor in communication with the memory. The processor is configured to execute the computer-executable instructions to receive the multi-dimensional input tensor 120, and process the input tensor 120 by passing the input tensor through the encoder down-sampling blocks 102, 104, 106 and 108, and/or the decoder up-sampling blocks 112, 114, 116 and 118 of the learning network 100.

In response to processing the multi-dimensional input tensor 120 by passing the input tensor through the learning network 100, the processor is configured to generate an output tensor 122 including at least one segmentation classification. For example, and as explained further below, the multi-dimensional input tensor may include a first dimension, a second dimension, and a plurality of channels (e.g., a multi-channel input). The output tensor may include one or more segmentation classifications (e.g., a multi-class output) corresponding to the multi-dimensional input tensor 120.

As shown in FIG. 1, the learning network 100 includes optional skip connections 124. The optional skip connections 124 may concatenate corresponding ones of the encoder down-sampling blocks and the decoder up-sampling blocks (e.g., encoder and decoder blocks at the same level in the down-sampling and up-sampling sequences, etc.). The skip connections may allow for finer (e.g., improved) information recovery during the up-sampling portion of the learning network 100.

FIG. 1 illustrates four encoder down-sampling blocks 102, 104, 106 and 108, and four decoder up-sampling blocks 112, 114, 116 and 118. In other embodiments, the learning network may include more or less encoder blocks and decoder blocks. For example, some learning networks might not include any up-sampling blocks (e.g., when the learning network is used only to detect that a signal is present or not present, etc.).

As explained further below, each block may include any suitable learning network convolution block, such as a Residual Network (ResNet) Basic block, a ResNet Bottleneck block, a simple two convolution block, a Dense Convolutional Network (DenseNet) block, a ResNeXt block, etc. In some embodiments, the RexNeXt Bottleneck and ResNet Basic blocks may provide improved accuracy compared to other block types.

For example, each encoder down-sampling block 102, 104, 106 and 108, and each decoder up-sampling block 112, 114, 116 and 118, may include at least two convolution (e.g. neural network) layers, and one or more non-linear rectification layers. The encoder blocks 102, 104, 106 and 108 may include a down-sampling layer, and the decoder blocks 112, 114, 116 and 118 may include an up-sampling layer (e.g., a transposed convolution up-sampling layer).

The learning network 100 may be configured to handle multi-dimensional tensor inputs by applying a generalized convolution algorithm on an input tensor of any dimension. For example, the input tensor may be a two-dimensional (2D) tensor with shape (N1, C), where N1 is a value of a first dimension of the input tensor and C is a number of channels of the input tensor.

A three-dimensional input tensor may have shape (N1, N2, C), where N1 and N2 are values of first and second dimensions of the input tensor, and C is a number of channels of the input tensor. A four-dimensional input tensor may have shape (N1, N2, N3, C), where N1, N2 and N3 are values of first, second and third dimensions of the input tensor, and C is a number of channels of the input tensor. Higher-dimensional input tensors may have similar tensor values, shapes, parameters, etc.

In some embodiments, the output tensor may be a two-dimensional tensor with shape (N1, N2), where N1 and N2 are values of first and second dimensions of the output tensor. The output tensor may be a 2D tensor regardless of the dimensions of the input tensor, the output tensor may not include a single channel, may include one or more segmentation classifications such as an image segmentation mask, etc.

Below is an example generic algorithm for processing a three-dimensional input tensor having a shape (N1, N2, C):

The encoder down-sampling functions are defined as tensor_output=Blockdown(tensor_input, output_shape), and the decoder up-sampling functions are defined as tensor_output=Blockup(tensor_input, output_shape).

The encoder blocks receive a 3D input tensor t, and the four encoder block functions d1-d4 are defined as:

```
d1 = Blockdown(t, (N1/2, N2/2, 64))
d2 = Blockdown(d1, (N1/4, N2/4, 128))
d3 = Blockdown(d2, (N1/8, N2/8, 256))
d4 = Blockdown(d3, (N1/16, N2/16, 512))
The center block function is defined as C = BlockCenter(d4, (N1/16,
N2/16, 1024)).
```

The four decoder blocks u1-u4 are defined as:

```
u1 = Blockup(t4, (N1/8, N2/8, 512))
u2 = Blockup(u1, (N1/4, N2/4, 256))
u3 = Blockup(u2, (N1/2, N2/2, 128))
u4 = Blockup(u3, (N1, N2, 64))
And the final output tensor block is defined as F = Final(u4, N1, N2, 1)
```

An example ResNet Basic block algorithm for an input tensor t is provided below:

```
out = convolution(t) #which doubles the output channel count, and halves
the rest of dimensions in the input tensor
out = batch_normalization(out)
out = rectified_linear(out)
out = convolution(out) # input and output tensor have the same shape
out = batch_normalization(out)
out = rectified_linear(out)
out += t
out = rectified_linear(out)
return out
```

As described above, each encoder block 102, 104, 106 and 108 may apply the general convolution algorithm to a received tensor of any dimension, by halving the value of each input dimension, and doubling the number of channels. In some embodiments, the first encoder block 102 that receives the multi-dimensional input tensor 120 may increase the number of channels to a specified value (e.g., 64 channels, etc.).

Similarly each decoder block 112, 114, 116 and 118 may apply the general convolution algorithm to a received tensor of any dimension, by doubling the value of each input dimension, and halving the number of channels. In some embodiments, the last encoder block 118 that generates the output tensor 122 may decrease the number of channels to a specified value (e.g., only a single channel, etc.).

For example, the learning network 100 may include one or more interpolation layers 126 to facilitate generating the output tensor 122 having the correct size (e.g., the same values for each dimension as the original multi-dimensional input tensor 120, a single channel, etc.).

Because deep learning in the learning network 100 may be developed based on processing images, the encoder blocks 102, 104, 106 and 108 may increase the field of view for each convolution kernel and reduce the image size. Halving the value of each dimension in the received tensor may be a preferred reduction amount in some embodiments, although other embodiments could reduce the value of each dimension in the received tensor by more or less than a factor of 0.5.

In order to compensate for information loss due to reducing the value of each dimension in the received tensor, the number of channels in the received tensor is increased. For example, doubling the number of channels in the received tensor may be a preferred increase amount in some embodiments, although other embodiments could increase the number of channels by more or less than a factor of two.

Further, image halving and channel doubling may be more computationally efficient than other factors. The decoder blocks 112, 114, 116 and 118 mirror the encoder blocks 102, 104, 106 and 108, by doubling the value of each dimension and halving the number of channels in each received tensor.

Deep learning in the learning network 100 may include forward and backward propagation. In the forward propagation path, convolution may include any suitable convolution algorithm, such as kernel image processing convolution, etc. Similarly, in the backward propagation path, convolution may include any suitable convolution algorithm, such as a stochastic gradient descent algorithm, etc.

Each encoder and decoder block may include a batch normalization algorithm, which normalizes data between multiple input tensors. For example, the input to the learning network 100 may have a shape (B, N1, N2, C), where B is a batch size or number of input tensors. Batch normalization may allow the multi-layer neural learning network 100 to work more efficiently during back propagation.

As described above, each encoder and decoder block may include non-linear rectification. The rectified_linear function may be a simple and efficient way to apply non-linearization in the learning network, and may be defined as ReLU(x) =max (0, x). In other embodiments, other suitable non-linear rectification algorithms may be used.

Figure 2:
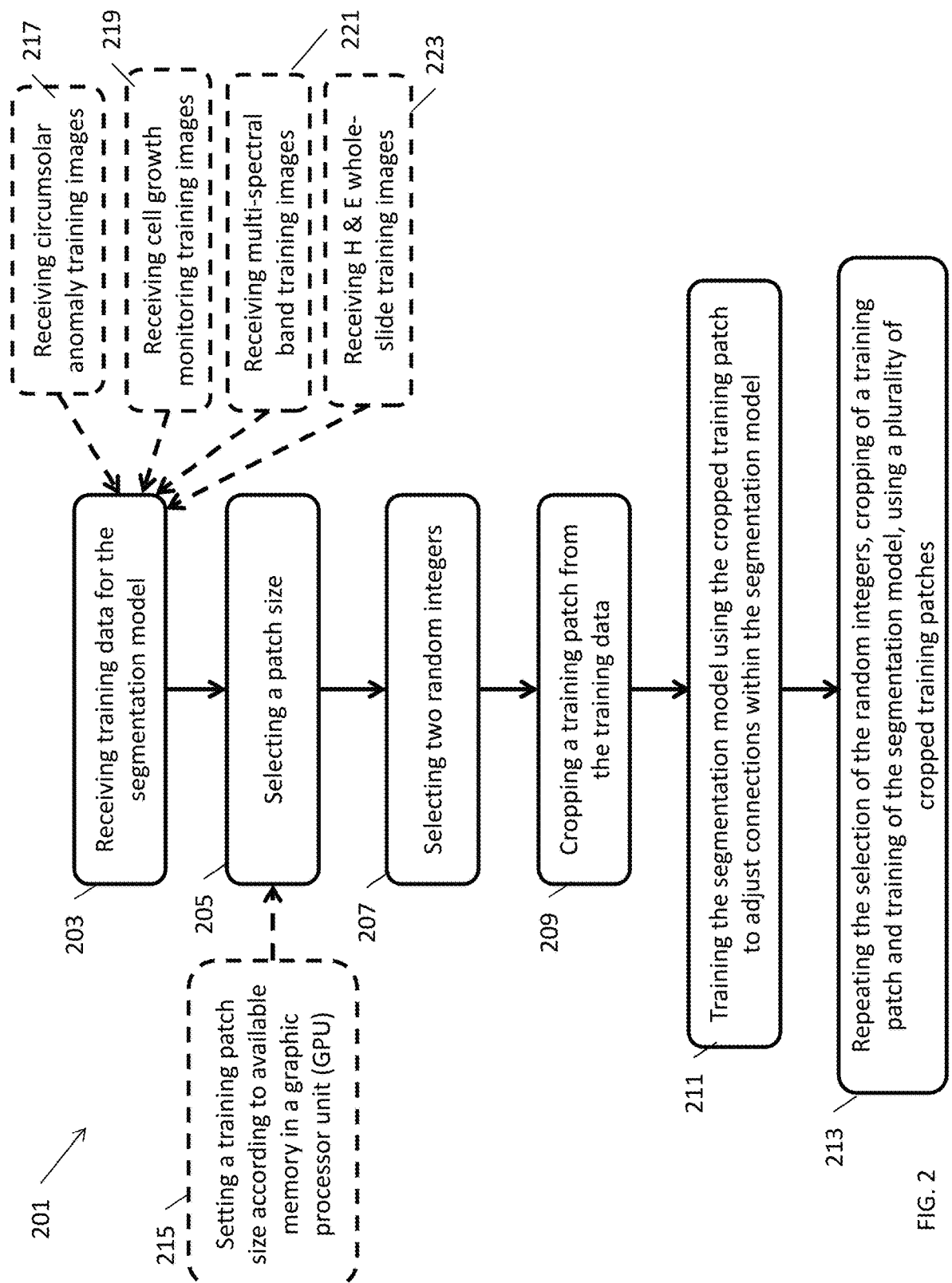
FIG. 2 is a flowchart of an example process for training an image segmentation model, according to another example embodiment of the present disclosure.

A computer-implemented method 201 for training a segmentation model is disclosed in FIG. 2, according to another example embodiment of the present disclosure. As shown in FIG. 2, at 203, the method 201 includes receiving training data (e.g., a training image) for the segmentation model (e.g., an image segmentation model), where the training data includes a training data size.

In a conventional UNet convolutional neural network, the training data size may be limited to a gray 512 pixel by 512 pixel single channel image, which is augmented by rotation, shift and deformation. In contrast, example embodiments described herein, such as the method 201, may allow for variable sized training data, where the training and testing patch sizes can be different as explained further below.

In some cases, larger input patch sizes produce more accurate results. For example, the input training data size for the method 201 may be larger than a conventional UNet convolutional neural network patch size of 512×512 pixels. Example training data sizes of the method 201 could be 1000 pixels by 2000 pixels, or include more or less pixels in each dimension.

At 205, the method 201 selects a patch size that is smaller than the training data size. For example, the patch size may be optionally set according to available memory in a graphic processor unit (GPU), as shown at 215 in FIG. 2. Using a larger patch size may yield better classification precision. In some cases, the patch size may be selected as half the size of the training data, although other ratios (e.g., 7/8, 3/4, 2/3, 1/3, 1/4, 1/8, etc.) of patch sizes could also be used.

For each iteration of the training method 201, two random integers may be selected (or more depending on the number of dimensions in the training data tensor), at 207, and a training patch may be cropped from the training data, at 209, according to the selected two random integers. For example, the training patch may have an origin (e.g., a starting point value in each dimension, etc.) in the training data that is selected randomly (e.g., according to random numbers such as integers).

The method 201 further includes training the segmentation model, at 211, using the cropped training patch, to adjust connections within the segmentation model. For example, the cropped training patch may have a corresponding known segmentation classification mask, and connections (e.g., parameters, values, weights, etc.) within the segmentation model may be adjusted by comparing a segmentation classification, produced by processing the cropped training patch using the segmentation model, to the corresponding known segmentation classification mask.

The method 201 also includes repeating the selection of random integers, cropping of a training patch, and training of the segmentation model to train the model with a plurality of randomly selected cropped training patches, at 213. Each cropped training patch may be cropped from the training data using an origin based on different random integers.

The training may be repeated until the plurality of randomly selected cropped training patches reaches a specified training patch count threshold, where the specified training patch count threshold is indicative that the connections within the segmentation model have been sufficiently adjusted to generate correct output classifications according to the training data.

By cropping fixed size patches at different random locations in the original training data, the training data can be reduced significantly. For example, using a training size patch of half the size of the original training data can allow for sufficient training of the segmentation model using thirty or less training images (e.g., when the segmentation model includes at least two million parameters, etc.). In contrast, a conventional UNet convolutional neural network that does not crop random training patches from training data may require 10,000 to 100,000 training data elements to sufficiently train the conventional UNet convolutional neural network.

As mentioned above, the size of the testing data can be variable, and preferably larger than 512 pixels by 512 pixels. Fixed size patches may be tiled on the data with overlapping. The batch of patches is supplied to the segmentation model for testing, and after classification the segmentation patches may be assembled into a segmentation output.

An example algorithm for training is provided below, where N is the training data size, the training patch size is M, and N is greater than M:

---

For each iteration:
select two random integers x, y where x and y are between [0, N-M-1]
crop a training patch with origin at (x, y) from the training data
train the model

---

If N>2*M, many different, unique training patches may be generated from each training data element. The training data (e.g., training dataset, etc.) should provide a sufficient representation of the entire dataset in order to train the segmentation model sufficiently. For example, the training data may include each unique object, classification, boundary, etc. from the dataset, and may display each unique object, classification, boundary, etc. at various sizes, orientations, colors, etc.

The training data may be selected according to the desired type of segmentation to be performed by the segmentation model. For example, in circumsolar image anomaly segmentation, the segmentation model may be used to segment clouds in close proximity to the sun.

FIGS. 3A and 3B illustrate example representative circumsolar images where clouds are located around the sun. FIG. 3A illustrates a normal image 328 of clouds located around the sun. Segmentation of the normal image 328 (e.g., generating an output image classification or mask highlighting the clouds, etc.), is difficult due to the high image intensity dynamic range from the sun, and the fuzzy and irregular boundary of the clouds.

As one solution, the normal image 328 may be transformed to an optical density space image 330 to provide additional information about the normal image 328, as shown in FIG. 3B. The optical density space image 330 may be stacked with the normal image 328 into a two or six channel plane (e.g., tensor), depending on whether the original and optical density space images 328 and 330 are grayscale or in color.

The stacked image tensor including the original and optical density space images 328 and 330 may be trained and tested by the image segmentation model to better segment/classify the clouds located near the sun. For example, in the method 201, receiving the training image may include receiving circumsolar anomaly training images, at 217.

As another example, the method 201 may be used to train an image segmentation model to classify cell growth monitoring. N images may be captured with different focusing areas for one or more biological cells, such as focusing at the center of the captured image in one picture, focusing at the edge of the captured image in another picture, etc.

Figure 4:
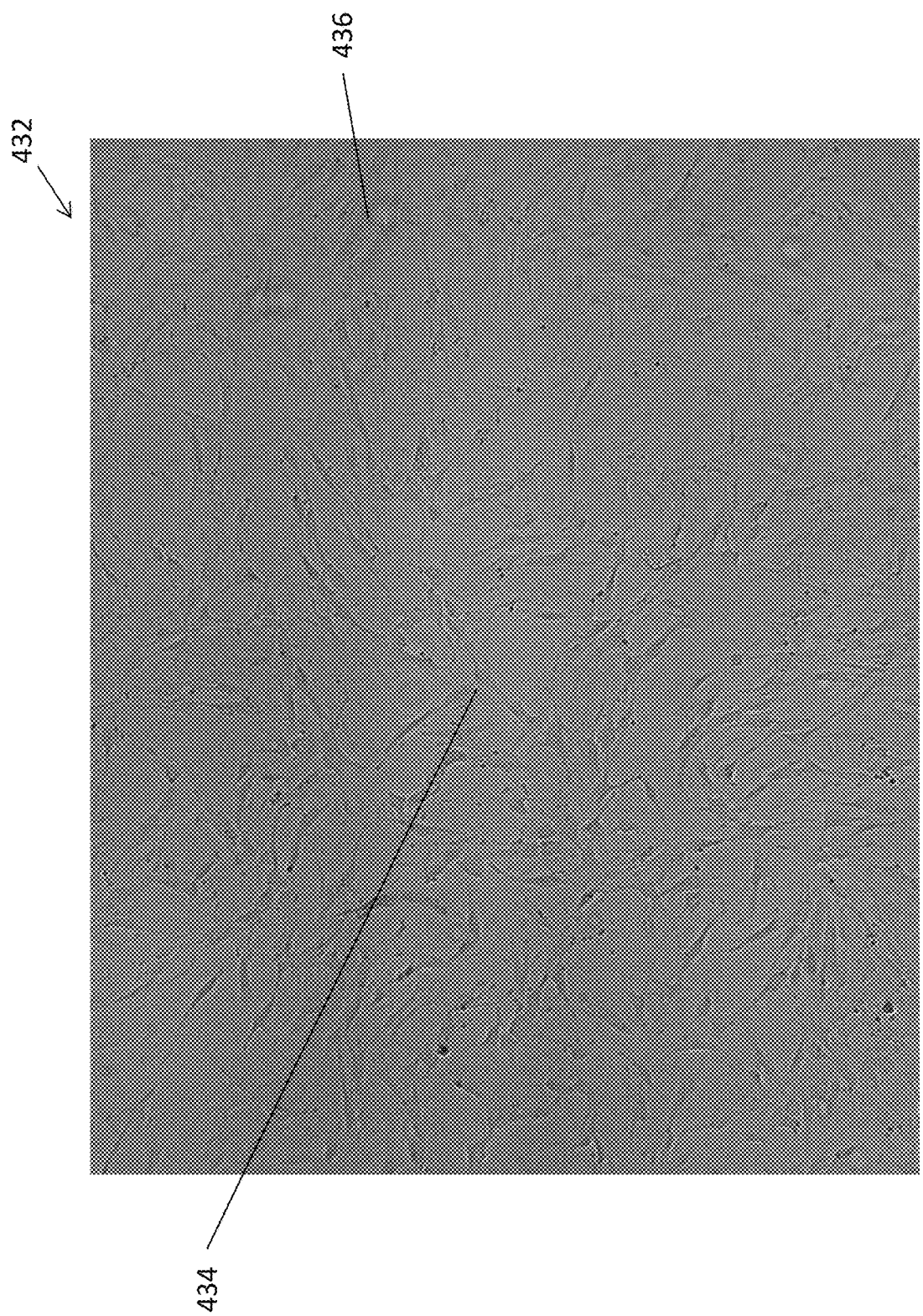
FIG. 4 is an example cell growth monitoring image having a focused center and an unfocused edge.

An example image 432 is illustrated in FIG. 4, where the cells at the center 434 of the image 432 are sharp and focused, while the cells at the edge 436 of the image 432 are blurry and out of focus. In other images, the focus area may be on the edge cells while the center cells are blurry, etc. Each of the images having different focusing areas may be stacked into a tensor (N, W, H,), where N denotes a different focus area for the image. For example, in the method 201, receiving the training image may include receiving circumsolar anomaly training images, at 219.

As a further example, the method 201 may be used for multi-spectral and hyper-spectral imaging. For example, while some color imaging may include three spectral bands of red (R), green (G) and blue (B), multi-spectral imaging may measure light in at least ten spectral bands (e.g., ten different wavelengths), while hyper-spectral imaging may use at least one hundred spectral bands.

Each spectral band is a channel C of tensor (C, W, H), where W and H represent the image width and height. For example, in the method 201, receiving the training image may include receiving multi-spectral band training images, at 221. RGB or gray images may be special cases of spectral imaging using only three or one channel, respectively.

For immunohistochemistry, the number of stains may be equal the number of class outputs. A stacked tensor including different spectral bands of light, different stains, etc. may be input to an image segmentation model to separate the stains as well as cell and/or tissue segmentation. In the image segmentation model, the color unmixing and cell segmentation may be combined in one step, which may improve the classification accuracy. This may provide a powerful method to study a tumor micro-environment.

Figure 5A:
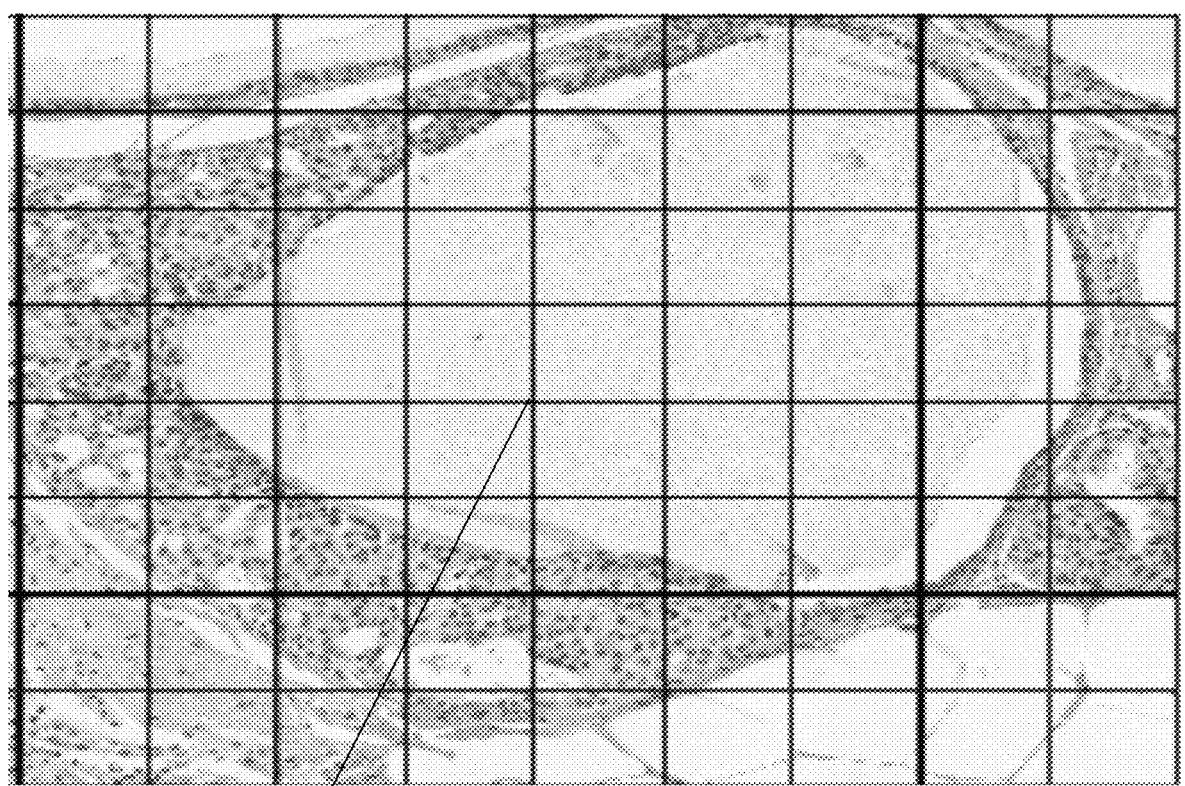
FIG. 5A is an example Hematoxylin and Eosin stain (H&E) whole-slide image (WSI).

As an additional example, the method 201 may be used for Hematoxylin and eosin stain (H&E) whole-slide image (WSI) tissue type classification, represented by 538 in FIG. 5A. Examples of tissue types include epithelial, stromal, lymphoid, smooth muscle, cancer, non-cancer, etc. An area that contains a sufficient amount of tissue may be selected if the WSI size is not fixed. A grid 540 of (N, M) may be generated for the WSI.

Regarding tissue classification, for each patch with tissue, a tensor with a shape (N, M, C) may be defined for ResNet34 with C=512, etc. For a non-tissue area, a white feature defined as R=G=B=224 may be used.

Figure 5C:
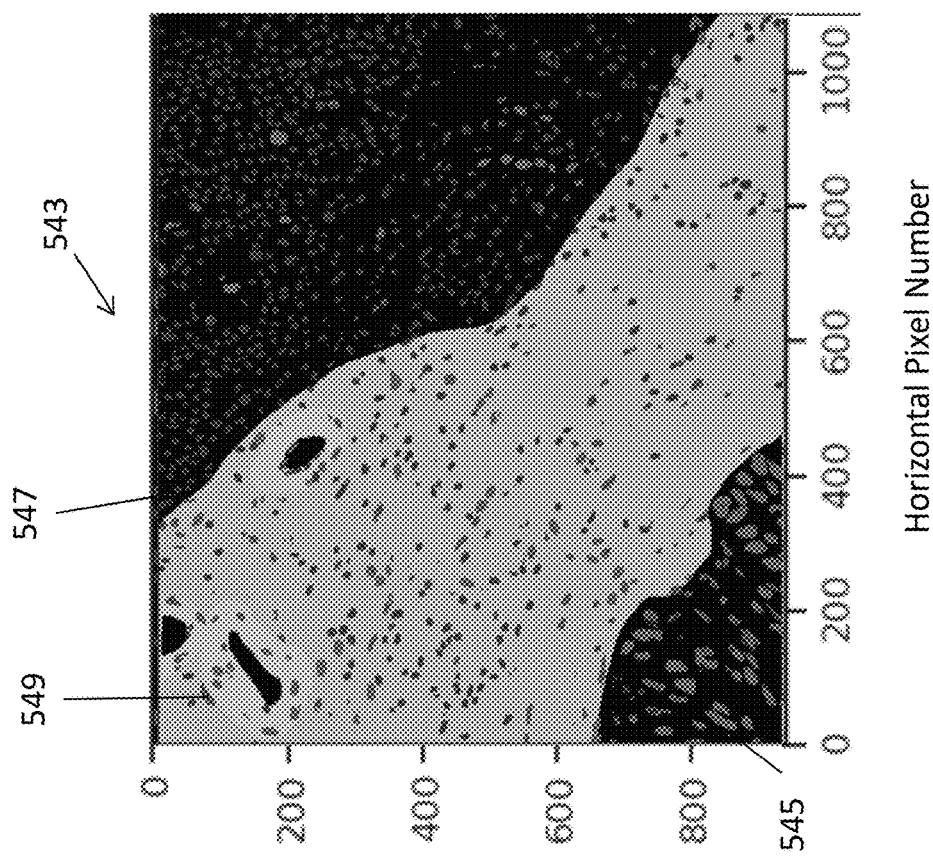
FIGS. 5B and 5C are example patch input and patch classified output H&E images.
Figure 5B:
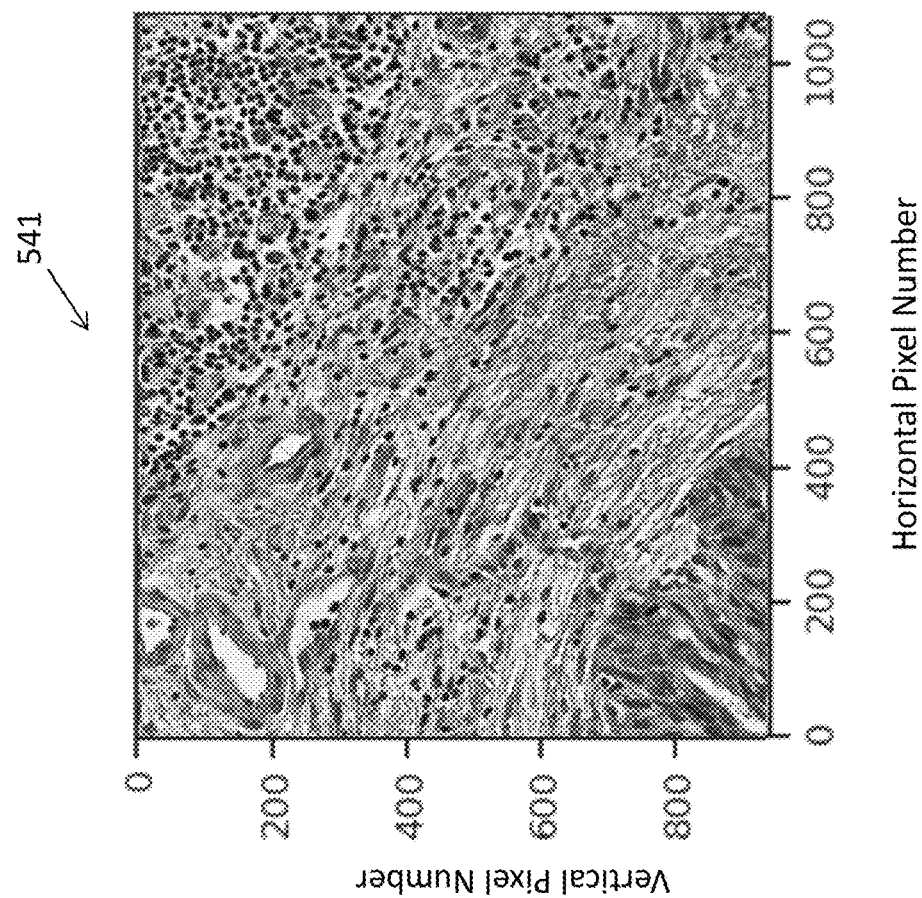

FIGS. 5B and 5C illustrate an H&E input image 541 and an output image 543, respectively. In the output image 543, the image is segmented into individual cells, and each cell is classified as either a cancer cell 545, a lymphocyte cell 547, or a cell 549 that is not cancer or a lymphocyte.

For example, in some models cell segmentation may be first be performed with a watershed model after color deconvolution, using a UNet model architecture, etc., then each individual cell may be classified with a standard deep learning architecture such as ResNet, Inception, etc. by running the neural networks on each cell in a whole slide image containing millions of cells. In contrast, some example embodiments herein may combine cell segmentation and classification together (e.g., using UNet, etc.) with multiple cell type annotation labels. These approaches may greatly increase the speed (e.g., about 1000 times faster, etc.) compared to separately performing cell segmentation and then classifying each individual cell.

As should be apparent, other embodiments may use other tensor shapes and values for tissue and non-tissue areas, etc. The (N, M, C) tensor may be supplied to the image model for tissue classification. For example, in the method 201, receiving the training image may include receiving H&E whole-slide training images at 223.

According to yet another example embodiment of the present disclosure, a non-transitory computer readable medium includes computer-executable instructions that define a learning network, where the learning network includes multiple encoder down-sampling blocks and multiple decoder up-sampling blocks.

The computer-executable instructions are executable by the processor to train the learning network using randomly selected patches from multiple training images, where each randomly selected patch is smaller than its corresponding training image, and each randomly selected patch is used to adjust connections within the multiple encoder down-sampling blocks and multiple decoder up-sampling blocks during training of the learning network.

The computer-executable instructions are further executable by the processor to supply a multi-dimensional input tensor to the trained learning network by passing the multi-dimensional input tensor through the trained multiple encoder down-sampling blocks and the trained multiple decoder up-sampling blocks to generate an output tensor including at least two segmentation classifications.

In this embodiment, the learning network is trained by selecting multiple random patches from each of multiple different training images, and adjusting connections (e.g., weights, parameters, values, etc.) in the multiple encoder down-sampling blocks and multiple decoder up-sampling blocks during the training with each patch. Once the learning network is trained, the trained learning network (e.g., the trained encoder and decoder blocks) can be used to generate an output tensor including at least two segmentation classifications for a multi-dimensional input tensor.

The multi-dimensional input tensor may include any suitable type of images, data, etc., and the multi-dimensional input tensor may be processed to determine any suitable classification(s) for the multi-dimensional input tensor. As one example, the multi-dimensional input tensor may include a video sequence (e.g., multiple still images in sequence). The video sequence may be processed to classify and track behavior of object(s) in the video, to classify and track vehicles in the video, to recognize and track person(s) in the video, to recognize and track item(s) in the video, etc.

For example, the multiple still images may be stacked to form a multi-dimensional input tensor having multiple channels (e.g., multiple still images). The learning network may process the stacked image tensor to generate multiple image segmentation masks for different objects, vehicle, people, items, etc. in the multi-dimensional input tensor. In the deep learning (DL) field, different models may be used such as a recurrent neural network (RNN), a long short-term memory (LSTM) cell, a convolutional neural network (CNN), etc., which may be used for video tracking, etc. In order to process sequential data, the relationship between individual frames may be retained in the neural network during each sequential training. Two dimensions may be used to retain the sequential information during training and testing, such as in a gated recurrent unit (GRU) model, LSTM model, RNN model, etc. It is noted that LSTM and GRU models are not designed for multi-dimensional data such as image processing.

In contrast to existing deep learning models, some example embodiments herein may stack a sequence of images, data, etc. into an input channel of a U-NET model architecture, in order to address segmentation, detection and tracking in a single model pipeline. For example, data frames may be stacked into a channel (c*N, h, 2), or an additional dimension may be added for a sequence (c, N, h, w), for a UNet architecture to retain sequential information. Because UNet uses a CNN architecture designed for image segmentation, detection and classification, sequential data analysis may be extended to multi-dimensions neutrally.

A person may be highlighted by classifying each frame over time to determine a moving location of the person. For example, a four-dimensional tensor may be used for the input with one dimension for channels (e.g., R, G, B, etc.), one dimension for time, and two dimensions for X and Y pixel values of the images. This approach could produce a three-dimensional output including X and Y dimensions in addition to the time value. This output could show movement of the classified person through different locations in the images over time.

As another option, the time value could be added to the channel information in a three-dimensional input tensor. In that case, the output may be a two-dimensional image with X and Y values, where movement of the classified person throughout all locations during the time period is illustrated in the output, such as a movement or activity hot spot map, etc.

In other embodiments, a three-dimensional image could be used with X, Y and Z values, such as augmented reality data, virtual reality data, volumetric data such as magnetic resonance imaging (MRI), etc. The 3D images could be combined with channel information to generate a 4D tensor input. In some cases, time information could be added to the channel data, or added as a fifth dimension in the input tensor.

If there are N images in a sequence and each image has a shape (C, W, H), where C is a channel such as RGB (or any other suitable channel), and W and H the image width and height, the model may be implemented by first determining the desired output. For example, the output may be a mask with the same size as the image (W, H), a sequence of masks (N, W, H), a mask with size (W', H') that is different than the input size (W, H), etc.

Next, an input tensor may be generated. If the images are stacked in a channel dimension, the input tensor shape may be (N*C, W, H). If a new dimension is created for the sequence, the input tensor shape may be (C, N, W, H). The input tensor shape could be (N*C, W, H) or (C, N, W, H). With an asymmetric encoder and decoder the output shape may be (W', H'), (N, W', H'), etc. If there are multiple inputs of non-compatible types such as video and audio data, multiple models may be created independently (e.g., a video model, an audio model, etc.), and the different models could be combined by a process such as a Kalman filter, etc.

Example movement tracking cases described above could be used for video surveillance, customer tracking, person recognition, etc., where a person may be moving in each image frame over time. This could be used for security (e.g., to detect aggressive behavior, to detect concealed items, etc.), to detect weapons, to provide advertising, directions through a retail environment, etc.

For example, an additional dimension may be used where an input has the form (C, N, W, H), and the output has a form (N, W, H). In that case, the video could be separated into N frames each having a width W and a height H. The channel C may be an RGB channel, etc. The N frames including the C channels may be supplied to the model for training, with N output images including a pre-defined training segmentation mask that is a highlighted area, rectangle, etc. that moves around to follow motion of a particular person, etc. After training, video including N images with C channels may be supplied to the model, and the model will output video of N images including a segmentation classification (e.g., a highlighted area, rectangle, etc.) that moves around though the images to track motion of a particular person, to highlight movement of a potentially dangerous object, etc. in each of the N images.

In some embodiments, the system may be automatically configured according to goals, limitations, etc. of the user. For example, a number of blocks in the model, a number of layers in each block, etc. could be automatically adjusted based on the desired inputs, outputs, etc. of the user. The architecture of the model, including sizes and numbers of blocks, layers, etc. could be set automatically to optimize performance based on available memory in the system, desired processing speed, etc., which may allow for a custom-built model for the user.

The model may use more encoder blocks than decoder blocks when the resolution of the output image is not as important as the resolution of the input image. For example, less decoder blocks could be used if the output is acceptable as a general rectangle, fuzzy outline, etc. indicating where a person is moving in the images, and it is unnecessary to illustrate an exact outline of the monitored person in the output image(s). In some cases, the input data may have the form (C, N, W, H) and the output data may have the form (N, W/M, H/M), where M may be 1, 2, 4, 8, etc. Larger values of M will reduce the output data resolution, and make the encoder and decoder sections of the model non-symmetric. For example, if detection of an object in an image is highly important to determine whether the object exists at all in the image, but the exact location of the object is of much lesser importance, a lower output resolution may be acceptable such that the output data has smaller width and height parameters (i.e., larger values of M) as compared than the input data.

An input tensor may be created based on radar/sonar data having multiple channels. The learning network may process the radar/sonar data to recognize and track different objects via segmentation classification. Before deep learning models were popularized, other machine learning (ML) models were used to for object tracking, such as a Kalman filter, a hidden Markov Chain, a Wavelet Transform, or auto-regression integrated moving average (ARIMA). In contrast to existing tracking models, some example embodiments herein may implement a tracking model where, for radar/sonar data, the output classification may include less information that a full output image, such as a single point, a direction and magnitude, etc. In this example, the input may be (C, N, W, H), and the output may be (N, W, H), (N, W', H'), etc.

The learning network may process an input tensor including audio data (in combination with or separate from video data), which may include multiple channels such as audio data from different microphones, etc. For example, one or more (e.g., three) microphones could be used to identify a person's location and track them, possibly using voice recognition. The location determined by the audio could be matched with an image based on the determined location, and the person could be tracked via images. In this example, the output may be (N, W', H'), where w'=6 and h'=0. The W' may be a signal point having three values (X, Y, Z), and the moving direction and magnitude may be a velocity three component (VX, VY, YZ) in a three dimensional space.

In some embodiments, the learning network may process input tensors including WiFi data (e.g., from multiple WiFi station, access points, etc.) in order to track an object. The WiFi data may be combined with video images to improve localization and tracking. For example, smartphone WiFi signal tracking could be used to transition between access points, to improve communication for signal handoffs and beam forming, etc.

Once a location is determined based on the WiFi data, different control applications could use the determined location to provide additional functions to a user, such as building a map and guiding a smartphone user, finding a store or parking location, finding people in a same group or family members, providing relevant advertisements, discounts, video/images, controlling movement of a robotic device such as a cleaning robot, etc.

One example embodiment of processing input tensors including WiFi data is illustrated in FIG. 6. As shown in FIG. 6, multiple mall WiFi access points 551 are distributed around a shopping area 553. Optionally, multiple mobile devices 555 may be located in the shopping area 553, each with their own WiFi interfaces. In some cases, the mobile devices 555 may each run a same application that communicate with one another via a network connection.

Different wireless sensors, interfaces, etc. (including the wireless network connection of a user's mobile device) may be used to detect signal strengths from different WiFi access points 551, from different mobile devices 555, etc. This WiFi signal strength detection data may be compared to a stored map of WiFi signal strengths in the shopping area 553, which may be stored on the user's mobile device, on a server that is updated based on movement of mobile devices 555 though the shopping area 553, etc. The user's mobile device (or a remote server in communication with the user's mobile device, etc.) may determine a location of the user's mobile device based on the comparison of the WiFi signal strength detection data to the WiFi map. The location may be determined as a segmentation classification of running a model with the detected WiFi signal strengths.

The location may be used to provide text messages to the user (e.g., via the mobile device) for landmark based instructions for directions of travel (e.g., head in a direction towards a location that the user can currently see, keep going until a specified store is reached, turn right, proceed forward to another store, press a specified key for updates, etc.). The landmark based instructions may be provided based on pre-stored map information of the shopping area 553, may be obtained from a server over a network connection, etc.

In examples above there may be an input image and a WiFi input. For the image input the shape may be (N, C, W1, H), and the output may be (N, 2, 0), where 2 is for location (X, Y). For the WiFi input, shape of (N, W2) may be used. In this case, W2 is the number of WiFi access points. The two output sequences (image and WiFi) may be fused together with an algorithm such as the Kalman filter, etc.

The learning network may process input tensors including network data, gaming data, etc. For example, the learning network may recognize and classify player patterns, identify bad behavior based on movement, speech, etc. The learning network could output tracking of player accounts, initiate communication with a player, etc. For example, training data of player speech or player video may be supplied to the model with pre-defined output classifications of identified bad behavior, bad speech, etc. Then the model could be run with video data separated into frames and sequentially supplied to the model, and the model could output a sequence of images in which bad player behavior/movement is classified with a highlighted region, a rectangular box, etc.

As another example, video data could be used to have an augmented reality object interact with a correct person, real object, etc. In this case, two inputs could be used (e.g., a video input and a microphone number). The training data could supply the two inputs as a multi-dimensional sequence of inputs with correct persons, real objects, etc. identified in the output. The model could then accept live video image frames and audio data input to process the input and output a video with a correct person, real object, etc. highlighted in image frames.

The learning network may process input tensors including medical data such as X-rays and MRIs, financial data such as market trends and predictions. The learning network may be used for behavior classification (e.g., for security purposes, etc.), where video or other data in an input tensor is segmented to classify aggressive behavior, concealed items, etc. In radiology imaging, two models may be used with one applied to an X-ray and another applied to MRI. The X-ray input may have the form of (W, H), with an output form of (W, H). In contrast, an MRI input may have the form of (D, W, H), with an output form of (W, H), where the value D is a projection of depth into the XY plane. The X-ray and MRI outputs could be combined to form a joint output image including classifications based off of both models.

As a further example, energy market day ahead forecasting models may use an input having the form (N, M, F), where N is a number of days used to forecast, M is a number of samples for each day, and F is a number of features (e.g., a load for each zone, a price for each zone, etc.). The model may have an output of (M), which may be a day ahead price or load forecast.

As another example, the learning network may be used for vehicle control. For example, the learning network could identify and classify an event and/or action, and then take action based on the classified output. Some examples for identification and/or classification include identifying drunk drivers and moving to another lane, identifying rock falls, identifying pedestrians or animals that may or are moving into a vehicle path, identifying/predicting whether an object may be in the path of a vehicle, etc.

The object and/or pattern recognition based on classification of vehicle video data by the learning network may be used to control a machine or system, such as navigation, steering, braking, or sensor system allocation. Some examples for controlling a machine or system may include one or more of causing a vehicle to slow down, stop, speed up, steer left, steer right, steer up, steer down, increase throttle, decrease throttle, turn on or off a light or alarm, send an electronic message, highlight the object on a display (e.g., a phone display or a vehicle windshield heads up display), and/or draw an anticipated movement path on a display.

In this example, the input may be a video sequence having a shape (N, C, W, H), and the output may be (N, W') where W' includes a system and/or machine control instruction, such as one of or a combination of some of the options listed above. For example, one output may be a braking instruction when an object is classified as being likely to intersect a vehicle's path. The classification may be specific with respect to where the obstacle will intersect the vehicle's path (e.g., 40 feet, 60 feet, 80 feet, 100 feet, or shorter or longer distances). Based on the classified intersection path distance, a different braking operation may be initiated (e.g., brake and stop within 40 feet, 60 feet, 80 feet, 100 feet, or shorter or longer distances).

The example uses above for the learning networks described herein are for purposes of illustration only, and are not intended to limit the scope of the present disclosure. The example learning networks described herein could be used in any application where pattern recognition is applied, and provide the advantages of being able to consider multiple channels and provide multiple simultaneous, possibly interrelated classifications.

As described herein, the example systems, learning networks, memory, processors, etc. may include a microprocessor, microcontroller, integrated circuit, digital signal processor, etc., which may include memory. The example systems, learning networks, memory, processors, etc. may be configured to perform (e.g., operable to perform, etc.) any of the example processes described herein using any suitable hardware and/or software implementation. For example, the systems, learning networks, memory, processors, etc. may execute computer-executable instructions stored in memory, may include one or more logic gates, control circuitry, etc.

Figure 7:
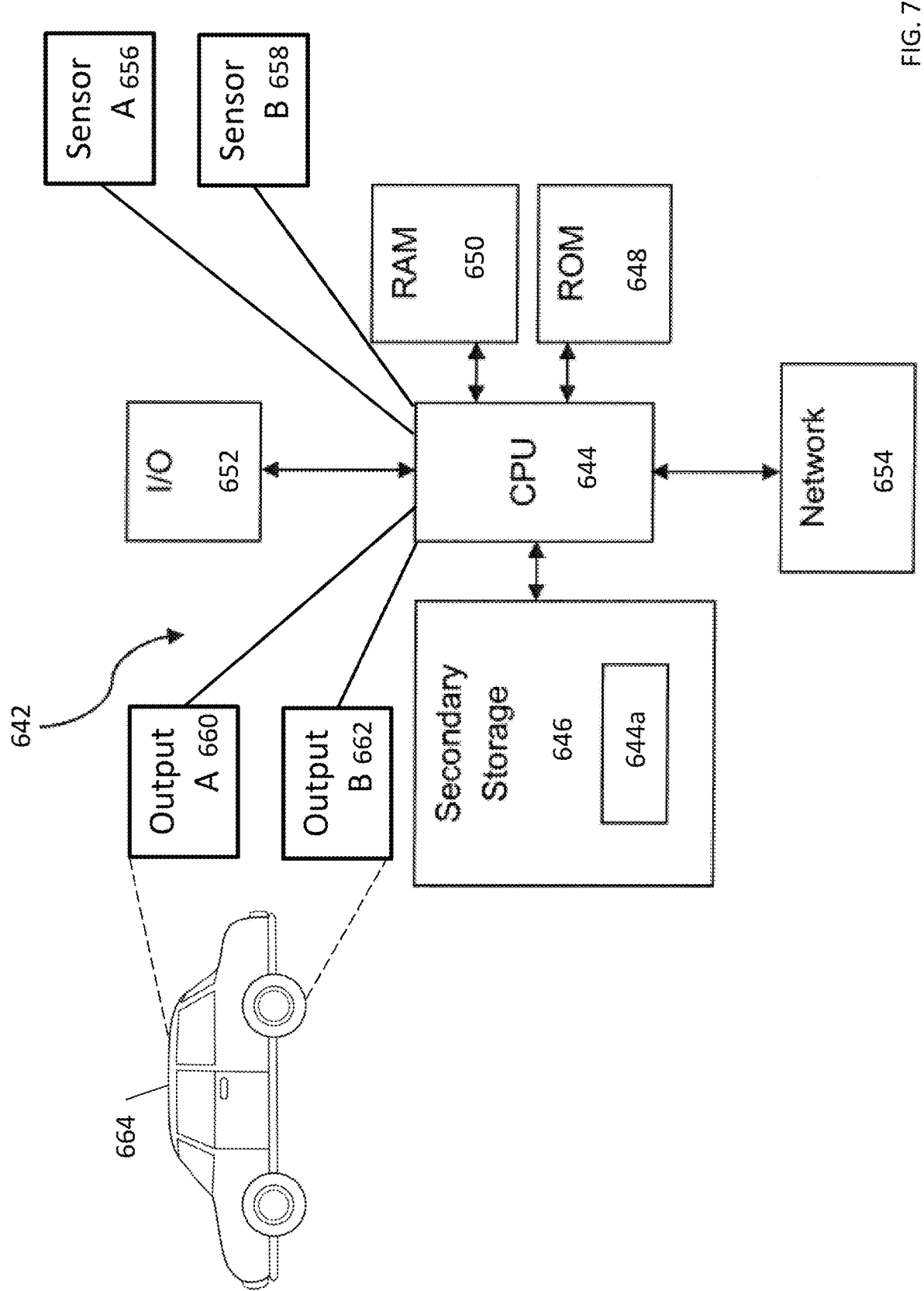
FIG. 7 is a block diagram of a system for performing segmentation of data based on tensor inputs, according to another example embodiment of the present disclosure.

FIG. 7 is a block diagram showing a system 642 for performing segmentation of data based on tensor inputs. The system 642 includes a processor 644 (which may be referred to as a central processor unit or CPU) that is in communication with memory devices including secondary storage 646 (such as disk drives), read only memory (ROM) 648, and random access memory (RAM) 650. The processor 644 may be implemented as one or more CPU chips. The system 642 may further comprise input/output (I/O) devices 652, and network connectivity devices 654.

The secondary storage 646 is typically comprised of one or more disk drives or tape drives and is used for non-volatile storage of data and as an over-flow data storage device if RAM 650 is not large enough to hold all working data. Secondary storage 646 may be used to store programs which are loaded into RAM 650 when such programs are selected for execution.

In this embodiment, the secondary storage 646 has a processing component 646a comprising non-transitory instructions operative by the processor 644 to perform various operations of the methods of the present disclosure. The ROM 648 is used to store instructions and perhaps data which are read during program execution. The secondary storage 646, the RAM 650, and/or the ROM 648 may be referred to in some contexts as computer readable storage media and/or non-transitory computer readable media.

I/O devices 652 may include printers, video monitors, liquid crystal displays (LCDs), plasma displays, touch screen displays, keyboards, keypads, switches, dials, mice, track balls, voice recognizers, card readers, paper tape readers, or other input devices.

The network connectivity devices 654 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols, such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other network devices. These network connectivity devices 654 may enable the processor 644 to communicate with the Internet or one or more intranets. With such a network connection, it is contemplated that the processor 644 might receive information from the network, or might output information to the network in the course of performing the above-described method operations. Such information, which is often represented as a sequence of instructions to be executed using processor 644, may be received from and outputted to the network, for example, in the form of a computer data signal embodied in a carrier wave.

The processor 644 executes instructions, codes, computer programs, scripts which it accesses from hard disk, floppy disk, optical disk (these various disk based systems may all be considered secondary storage 646), flash drive, ROM 648, RAM 650, or the network connectivity devices 654. While only one processor 644 is shown, multiple processors may be present. Thus, while instructions may be discussed as executed by a processor, the instructions may be executed simultaneously, serially, or otherwise executed by one or multiple processors.

The system 642 may include one or more sensors, such as sensor A 656, sensor B 658, etc. The sensors could detect video (e.g., cameras), audio (e.g., microphones), radar, wireless signal strength, acceleration, temperature, speed, pressure, etc., as needed for a desired system implementation. The sensors 656 and 658 may collect data for use by the system 642 to be incorporated as inputs to a segmentation model, etc.

The system 642 may include one or more output systems, such as output system A 660, output system B 662, etc. The output systems 660 and 662 may control different devices based on outputs of a segmentation model, such as acceleration, braking, steering, etc. of a vehicle 664.

Although the system 642 is described with reference to a computer, it should be appreciated that the system may be formed by two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the system 642 to provide the functionality of a number of servers that is not directly bound to the number of computers in the system 642. In an embodiment, the functionality disclosed above may be provided by executing an application and/or applications in a cloud computing environment. Cloud computing may comprise providing computing services via a network connection using dynamically scalable computing resources. A cloud computing environment may be established by an enterprise and/or may be hired on an as-needed basis from a third party provider.

It is understood that by programming and/or loading executable instructions onto the system 642, at least one of the CPU 644, the ROM 648, and the RAM 650 are changed, transforming the system 642 in part into a specific purpose machine or apparatus having the novel functionality taught by the present disclosure. It is fundamental to the electrical engineering and software engineering arts that functionality that can be implemented by loading executable software into a computer can be converted to a hardware implementation by well-known design rules.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purposes of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally", "about", and "substantially" may be used herein to mean within manufacturing tolerances.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for performing classification of data based on tensor inputs, the system comprising:

memory storing computer-executable instructions defining a learning network, where the learning network includes a plurality of sequential encoder down-sampling blocks, and the learning network is a segmentation model including deep learning parameters adjusted by comparing segmentation classifications produced by processing cropped training patches using the segmentation model to corresponding specified segmentation classification masks; and a processor in communication with the memory, the processor configured to execute the computer-executable instructions to:

stack multiple biological cell images to form a multi-dimensional input tensor, the multiple biological cell images including biological cell images including different spectral bands of light, the multi-dimensional input tensor including at least a first dimension, a second dimension and a plurality of channels, wherein each of the different spectral bands of light is a channel C of the multi-dimensional input tensor, where parameters W and H of the multi-dimensional input tensor represent a width and a height of the biological cell images;

process the received multi-dimensional input tensor by passing the received multi-dimensional input tensor through the plurality of sequential encoder down-sampling blocks, the processing including a combination of cell segmentation and classification with multiple cell type annotation labels; and generate an output tensor in response to processing the received multi-dimensional input tensor via the plurality of sequential encoder down-sampling blocks of the learning network, the output tensor including at least one segmentation classification.

2. The system of claim 1, wherein:

the learning network includes a plurality of sequential decoder up-sampling blocks;

processing the received multi-dimensional input tensor includes passing the received multi-dimensional input tensor through the plurality of sequential encoder down-sampling blocks and the plurality of sequential decoder up-sampling blocks of the learning network; and generating the output tensor includes generating the output tensor in response to processing the received multi-dimensional input tensor via the plurality of sequential encoder down-sampling blocks and the plurality of sequential decoder up-sampling blocks of the learning network.

3. The system of claim 2, wherein a first one of the sequential encoder down-sampling blocks is configured to divide a value for each dimension of the multi-dimensional tensor by two and to increase a number of the channels of the multi-dimensional tensor to a specified initial channel value, and each subsequent one of the sequential encoder down-sampling blocks is configured to divide the value for each dimension of the tensor received from a previous encoder down-sampling block by two and to double the number of channels of the tensor received from the previous encoder down-sampling block.

4. The system of claim 2, wherein a first one of the sequential decoder up-sampling blocks is configured to double a value for each dimension of the tensor received from a previous block, and to divide a number of the channels of the tensor received from the previous block by two.

5. The system of claim 2, wherein:
each encoder down-sampling block and each decoder up-sampling block includes at least two convolution layers; and
each convolution layer includes non-linear rectification.

6. The system of claim 2, wherein the plurality of encoder down-sampling blocks comprises four encoder down-sampling blocks and the plurality of decoder up-sampling blocks comprises four decoder up-sampling blocks.

7. The system of claim 2, wherein connections between the plurality of encoder down-sampling blocks and the plurality of decoder up-sampling blocks in the learning network are arranged in a UNet convolutional neural network architecture.

8. The system of claim 2, where a final one of the decoder up-sampling blocks includes an interpolation layer configured to generate the output tensor having a size where values for each dimension of the output tensor are the same as values for each dimension of the multi-dimensional input tensor.

9. The system of claim 2, wherein the learning network includes one or more skip connections each arranged to concatenate one of the encoder down-sampling blocks to a corresponding one of the decoder up-sampling blocks.

10. The system of claim 1, wherein:
the input tensor includes at least a third dimension value; and
the output tensor includes two dimensions.

11. The system of claim 1, wherein:
the output tensor includes at least two segmentation classifications; or
at least one of the segmentation classifications includes a segmentation mask for an image.

12. The system of claim 1, where each encoder down-sampling block includes at least one of a Residual Network (ResNet) Basic block, a ResNet Bottleneck block, a simple two convolution block, a Dense Convolutional Network (DenseNet) block, and a ResNeXt block.

13. A computer-implemented method of training the segmentation model of claim 1, the method comprising:
receiving training data for the segmentation model, the received training data having a training data size;
selecting a patch size, where the selected patch size is smaller than the training data size;
selecting two random integers;
cropping a training patch from the training data, the training patch having an origin according to the selected two random integers;
training the segmentation model using the cropped training patch to adjust the deep learning parameters within the segmentation model; and
repeating the selection of two random integers, cropping of a training patch, and training of the segmentation model to train the model with a plurality of randomly selected cropped training patches, where each randomly selected cropped training patch is cropped from the training data using an origin based on different random integers.

14. The method of claim 13, wherein the training is repeated until the plurality of randomly selected cropped training patches reaches a specified training patch count threshold, where the specified training patch count threshold is indicative that the deep learning parameters within the segmentation model have been sufficiently adjusted to generate correct output classifications according to the training data.

15. The method of claim 13, wherein selecting the patch size includes setting the patch size as half of the training data size or setting the patch size according to available memory in a graphic processor unit (GPU).

16. The method of claim 13, wherein training the segmentation model includes using thirty or less training images.

17. The method of claim 13, further comprising at least one of:
performing circumsolar image anomaly segmentation by stacking an optical density space image on a normally captured image to define a multi-dimensional input tensor having multiple channels;
performing cell growth monitoring segmentation by stacking different images having different focusing areas to define a multi-dimensional input tensor having multiple channels;
performing multi-spectral imaging segmentation, where each multi-spectral band image includes between ten and one hundred spectral bands, by stacking the multi-spectral band images to define a multi-dimensional input tensor having multiple channels; and
performing H & E whole-slide imaging by tiling the training data into smaller training patches, wherein an output image includes at least one of a lymphocyte cell, epithelial cell or stromal cell, and at least one of connective tissue, lymphoid tissue or smooth muscle tissue.

18. A non-transitory computer readable medium including computer-executable instructions that define the learning network of claim 1, where the computer-executable instructions are executable by a processor to:
train the learning network using randomly selected patches from multiple training data elements, where each randomly selected patch is smaller than its corresponding training data element, and each randomly selected patch is used to adjust the deep learning parameters within the multiple encoder down-sampling blocks and multiple decoder up-sampling blocks during training of the learning network; and
supply a multi-dimensional input tensor to the trained learning network by passing the multi-dimensional input tensor through the trained multiple encoder down-sampling blocks and the trained multiple decoder up-sampling blocks to generate an output tensor including at least two segmentation classifications.

19. The non-transitory computer readable medium of claim 18, wherein:
the multi-dimensional input tensor includes a video sequence, and supplying the multi-dimensional input tensor includes processing the video sequence for at least one of classifying behavior, classifying vehicles, person recognition, and item recognition; the multi-dimensional input tensor includes radar and/or sonar data, and supplying the multi-dimensional input tensor includes processing the radar and/or sonar data for object recognition;
the multi-dimensional input tensor includes audio data received from different microphones;
the multi-dimensional input tensor includes vehicle control data; and supplying the multi-dimensional input tensor includes processing the vehicle control data for at least one of object recognition, pattern recognition, navigation and/or steering control, route planning, and braking in emergency situations;
the multi-dimensional input tensor includes behavior data, and supplying the multi-dimensional input tensor includes processing the behavior data for at least one of aggressive behavior classification and concealed items classification; or the multi-dimensional input tensor includes at least one of gaming data for classifying player behavior and medical data for classifying X-Rays and/or MRIs.

\* \* \* \* \*